United States Patent
Kitov

(10) Patent No.: US 11,753,273 B2
(45) Date of Patent: Sep. 12, 2023

(54) METHOD AND AN APPARATUS FOR DETERMINING AN ALLOCATION DECISION FOR AT LEAST ONE ELEVATOR

(71) Applicant: Kone Corporation, Helsinki (FI)

(72) Inventor: Sergey Kitov, Helsinki (FI)

(73) Assignee: Kone Corporation, Helsinki (FI)

( * ) Notice: Subject to any disclaimer, the term of this patent is extended or adjusted under 35 U.S.C. 154(b) by 1505 days.

(21) Appl. No.: 15/964,827

(22) Filed: Apr. 27, 2018

(65) Prior Publication Data

US 2018/0244491 A1    Aug. 30, 2018

Related U.S. Application Data

(63) Continuation of application No. PCT/FI2015/050795, filed on Nov. 16, 2015.

(51) Int. Cl.
| | | |
|---|---|---|
| B66B 1/24 | (2006.01) |
| G06N 3/08 | (2023.01) |
| G06N 3/044 | (2023.01) |
| G06N 3/086 | (2023.01) |
| G06N 5/046 | (2023.01) |

(52) U.S. Cl.
CPC .......... B66B 1/2408 (2013.01); G06N 3/044 (2023.01); G06N 3/08 (2013.01); G06N 3/086 (2013.01); G06N 5/046 (2013.01); *B66B 2201/231* (2013.01); *B66B 2201/235* (2013.01); *B66B 2201/402* (2013.01)

(58) Field of Classification Search
None
See application file for complete search history.

(56) References Cited

U.S. PATENT DOCUMENTS

| | | | | |
|---|---|---|---|---|
| 5,354,957 A | * | 10/1994 | Robertson | B66B 1/2458 187/387 |
| 5,612,519 A | * | 3/1997 | Chenais | B66B 1/2458 187/382 |
| 5,767,461 A | * | 6/1998 | Nakagawa | B66B 1/2458 187/382 |

(Continued)

FOREIGN PATENT DOCUMENTS

| | | | |
|---|---|---|---|
| WO | WO-2005100223 A2 * | 10/2005 | B66B 1/2458 |
| WO | WO-2014198302 A1 | 12/2014 | |

OTHER PUBLICATIONS

International Search Report PCT/ISA/210 for International Application No. PCT/FI2015/050795 dated Mar. 9, 2016.

(Continued)

*Primary Examiner* — Paulinho E Smith
(74) *Attorney, Agent, or Firm* — Harness, Dickey & Pierce, P.L.C.

(57) ABSTRACT

A method for determining an allocation decision for at least one elevator includes using an existing calls in an elevator system as a first input in a machine learning module, processing the first input with the machine learning module to provide a first output comprising a first allocation decision, using the first output as a second input in an iterative module, processing the second input with the iterative module to provide a second ouput comprising a second allocation decision, and providing the second allocation decision to an elevator control module and to an allocation decision storage for further machine learning module training.

11 Claims, 3 Drawing Sheets

(56) References Cited

U.S. PATENT DOCUMENTS

| | | | |
|---|---|---|---|
| 5,923,004 A * | 7/1999 | Whitehall | B66B 1/2408 187/382 |
| 6,325,178 B2 * | 12/2001 | Hikita | B66B 1/2458 187/382 |
| 6,619,436 B1 * | 9/2003 | Hikita | B66B 1/2458 187/382 |
| 7,513,337 B2 * | 4/2009 | Siikonen | B66B 1/2458 187/382 |
| 7,975,808 B2 * | 7/2011 | Smith | B66B 1/2458 187/382 |
| 10,683,189 B2 * | 6/2020 | Saraswat | B66B 1/3407 |
| 2008/0296099 A1 | 12/2008 | Tyni et al. | |
| 2010/0179850 A1 * | 7/2010 | Fuller | G06Q 10/0631 705/7.12 |
| 2018/0244491 A1 * | 8/2018 | Kitov | B66B 1/2408 |
| 2019/0193993 A1 * | 6/2019 | Elomaa | G05B 19/042 |
| 2020/0062541 A1 * | 2/2020 | Vuorenala | B66B 1/3461 |
| 2021/0253394 A1 * | 8/2021 | Kokkala | G05B 13/042 |

OTHER PUBLICATIONS

Written Opinion of the International Searching Authority PCT/ISA/237 for International Application No. PCT/FI2015/050795 dated Mar. 9, 2016.

Liu, Jian et al. "RBF Optimization Control Based on PSO for Elevator Group System." 2011 International Conference on Information Science and Technology (ICIST): pp. 363-368.

Tai, Jianzhe et al. "Modeling and Optimizing of Elevator Group Control System with Destination Floor Guidance." Asia Simulation Conference—7th International Conference on System Simulation and Scientific Computing, 2008 (ICSC 2008): pp. 1370-1376.

Zhang, Jun et al. "Evolutionary Computation Meets Machine Learning: A Survey." *IEEE Computational Intelligence Magazine* 6.4 (2011): pp. 68-75.

* cited by examiner

METHOD AND AN APPARATUS FOR DETERMINING AN ALLOCATION DECISION FOR AT LEAST ONE ELEVATOR

This application is a continuation of PCT International Application No. PCT/FI2015/050795 which has an International filing date of Nov. 16, 2015, the entire contents of which are incorporated herein by reference.

BACKGROUND

Heuristic optimization algorithms, for example, genetic algorithms or ant colony optimization algorithms may be used in elevator systems to generate elevator allocation decisions. Heuristic optimization algorithms are iterative algorithms and therefore they can take very much time of execution when a long population and a great number of iterations are used. However, when allocating an elevator car in an elevator system, time is usually an important parameter. Therefore, the end result of applying a heuristic optimization algorithm to call allocations may not provide an optimal call allocation solution. It, however, usually provides a reasonable solution within a given time limit.

It is, however, desirable to find solutions that are able to find better allocation decisions faster.

SUMMARY

According to a first aspect of the invention, there is provided a method for determining an allocation decision for at least one elevator. The method comprises using existing calls in an elevator system as a first input in a machine learning module, processing the first input with the machine learning module to provide a first output comprising a first allocation decision, using the first output as a second input in an iterative module, processing the second input with the iterative module to provide a second output comprising a second allocation decision, and providing the second allocation decision to an elevator control module and to an allocation decision storage for further machine learning module training.

In one embodiment, the method further comprises, prior to using existing calls in an elevator system as a first input in a machine learning module, processing, with the iterative module, existing calls in the elevator system to provide allocation decisions, providing the allocation decisions from the iterative module to the elevator control module and to the allocation decision storage, using, until at least one predetermined criterion is fulfilled, the allocation decisions to teach the machine learning module, and using, after the at least one predetermined criterion has been fulfilled, existing calls in the elevator system as the first input in the machine learning module.

In one embodiment, alternatively or in addition, the method further comprises using predicted calls in the elevator system as the first input to the machine learning module.

In one embodiment, alternatively or in addition, the machine learning module comprises an artificial neural network module.

In one embodiment, alternatively or in addition, the iterative module comprises at least one of a generic algorithm module and an ant colony algorithm module.

According to a second aspect of the invention, there is provided an apparatus for determining an allocation decision for at least one elevator. The apparatus comprises a machine learning module, an iterative module and an allocation decision storage. The apparatus further comprises means for using existing calls in an elevator system as a first input in the machine learning module, wherein the machine learning module is configured to process the first input to provide a first output comprising a first allocation decision, means for using the first output as a second input in an iterative module, wherein the iterative module is configured to process the second input to provide a second output comprising a second allocation decision, and means for providing the second allocation decision to an elevator control module and to the allocation decision storage for further machine learning module training.

In one embodiment the iterative module is configured to process, prior to using existing calls in an elevator system as a first input to a machine learning module, existing calls in the elevator system to provide allocation decisions, wherein the apparatus further comprises means for providing the allocation decisions from the iterative module to the elevator control module and to the allocation decision storage, means for using, until at least one predetermined criterion is fulfilled, the allocation decisions to teach the machine learning module, and means for using, after the at least one predetermined criterion has been fulfilled, existing calls in the elevator system as the first input in the machine learning module.

In one embodiment, alternatively or in addition, the means for using is configured to use predicted calls in the elevator system as the first input to the machine learning module.

In one embodiment, alternatively or in addition, the machine learning module comprises an artificial neural network module.

In one embodiment, alternatively or in addition, the iterative module comprises at least one of a generic algorithm module and an ant colony algorithm module.

In one embodiment, alternatively or in addition, the machine learning module comprises a graphics processing unit.

According to a third aspect, there is provided an apparatus for determining an allocation decision for at least one elevator. The apparatus comprises at least one processing unit and at least one memory. The at least one memory stores program instructions that, when executed by the at least one processing unit, cause the apparatus to use existing calls in an elevator system as a first input to a machine learning module, process the first input with the machine learning module to provide a first output comprising a first allocation decision, use the first output as a second input in an iterative module process the second input with the iterative module to provide a second output comprising a second allocation decision, and provide the second allocation decision to an elevator control module and to an allocation decision storage for further machine learning module training.

According to a fourth aspect, there is provided a computer program comprising program code, which when executed by at least one processing unit, causes the at least one processing unit to perform the method of the first aspect.

In one embodiment, the computer program is embodied on a computer-readable medium.

According to a fifth aspect, there is provided a method for determining an allocation decision for at least one elevator. The method comprises processing, with an iterative module, existing calls in an elevator system to provide an allocation decision, providing the allocation decision from the iterative module to an elevator control module and to an allocation decision storage, using the allocation decision to teach the machine learning module, detecting that at least one predetermined criterion is fulfilled, using, after the at least one predetermined criterion is fulfilled, existing calls in the elevator system as a first input in a machine learning module, processing the first input with the machine learning module to provide a first output comprising a first allocation decision, using the first output as a second input in the iterative module, processing the second input with the iterative module to provide a second output comprising a second allocation decision, and providing the second allocation decision to the elevator control module and to the allocation decision storage for further machine learning module training.

According to a sixth aspect, there is provided an apparatus for determining an allocation decision for at least one elevator. The apparatus comprises a machine learning module, an iterative module and an allocation decision storage. The iterative module is configured to process existing calls in an elevator system to provide an allocation decision, means for providing the allocation decision from the iterative module to an elevator control module and to the allocation decision storage, means for using the allocation decision to teach the machine learning module, means for detecting that at least one predetermined criterion is fulfilled, means for using, after the at least one predetermined criterion is fulfilled, existing calls in the elevator system as a first input in the machine learning module, wherein the machine learning module is configured to process the first input to provide a first output comprising a first allocation decision, means for using the first output as a second input in the iterative module, wherein the iterative module is configured to process the second input to provide a second output comprising a second allocation decision, and means for providing the second allocation decision to the elevator control module and to the allocation decision storage for further machine learning module training.

According to a seventh aspect, there is provided an apparatus for determining an allocation decision for at least one elevator. The apparatus comprises at least one processing unit and at least one memory. The at least one memory stores program instructions that, when executed by the at least one processing unit, cause the apparatus to process, with an iterative module, existing calls in an elevator system to provide an allocation decision, provide the allocation decision from the iterative module to an elevator control module and to an allocation decision storage, use the allocation decision to teach the machine learning module, detect that at least one predetermined criterion is fulfilled, use, after the at least one predetermined criterion is fulfilled, existing calls in the elevator system as a first input in a machine learning module, process the first input with the machine learning module to provide a first output comprising a first allocation decision, use the first output as a second input in the iterative module, process the second input with the iterative module to provide a second output comprising a second allocation decision, and provide the second allocation decision to the elevator control module and to the allocation decision storage for further machine learning module training.

According to an eight aspect, there is provided a computer program comprising program code, which when executed by at least one processing unit, causes the at least one processing unit to perform the method of the fifth aspect.

In one embodiment, the computer program is embodied on a computer-readable medium.

According to an eight aspect, there is provided an elevator system comprising an elevator control module; and an apparatus of any of the second, third, sixth and seventh aspect.

The means disclosed above may be implemented using at least one processor or at least one processor and at least one memory connected to the at least one processor, the memory storing program instructions to be executed by the at least one processor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1A:
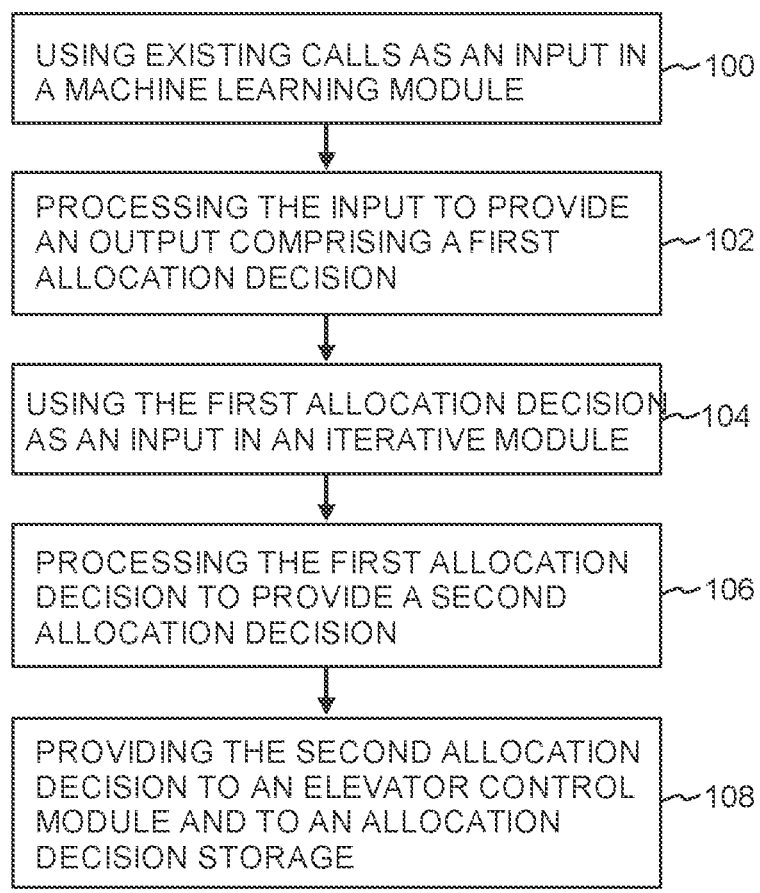
FIG. 1A is a flow diagram illustrating a method for determining an allocation decision for at least one elevator in an elevator system.

FIG. 1A is a flow diagram illustrating a method for determining an allocation decision for at least one elevator in an elevator system. FIG. 1A is discussed together with FIG. 2 that illustrates an apparatus 200 method for determining an allocation decision for the elevator.

The apparatus 200 comprises a machine learning module 202, an iterative module 204, an allocation decision storage, at least one processing unit 208 and at least one memory 210. The machine learning module 202 provides, for example, an artificial neural network for computing allocation decisions. The iterative module 204 provides, for example, a genetic algorithm or an ant colony algorithm for computing allocation decisions. The allocation storage module 206 may store previously made allocation decisions. These decisions can be used to train the machine learning module 202.

When an allocation decision needs to be made for at least one elevator, existing calls are used as an input in the machine learning module 202 (step 100). The machine learning module 202 processes the input and provides an output (step 102). The output comprises a first allocation decision for at least one elevator that it then used as an input in the iterative module (step 104). The first allocation decision determined by the machine learning module 202 is thus used as a starting point for further optimization by the iterative module 204. The iterative module 204 may implement, for example, a genetic algorithm or an ant colony algorithm. The iterative module 204 processes the input (allocation decision) from the machine learning module 204 and in response to the processing, provides a second allocation decision (step 106). The second allocation decision can then be sent to an elevator control module 212. The term "allocation decision" used above may refer to an allocation command based on which the elevator control module 212 may directly control an elevator car or elevator cars.

The total number of possible allocation commands grows exponentially when the number of calls in an elevator system increases. Further, allocation decisions may need to be calculated repeatedly (for example, at 0.5 s intervals) so that state changes in the elevator system are taken into account in the allocation decisions. This means that it may not be possible to evaluate all possible allocation commands within a time frame available for making an allocation decision. Iterative optimization algorithms can be used to find a fairly good solution. This solution, however, may not be an optimal solution. When using only an iterative optimization algorithm, the quality of the found solution depends on the quality of the input used as a starting point for the iterative optimization algorithm. The better the starting point (i.e. input to the iterative optimization algorithm) is, the better solution the iterative optimization algorithm finds. Normally, random solutions are selected for new calls and a previous allocation command may be used as a starting point for calls that are already in the elevator system. When the machine learning module is used as disclosed above, it gives an output very quickly. Further, when the machine learning module is trained properly, the allocation command provided by the machine learning module will provide a better starting point for the iterative module. Thus, the iterative module is able to provide better outputs (i.e. allocation commands or decisions).

Figure 1B:
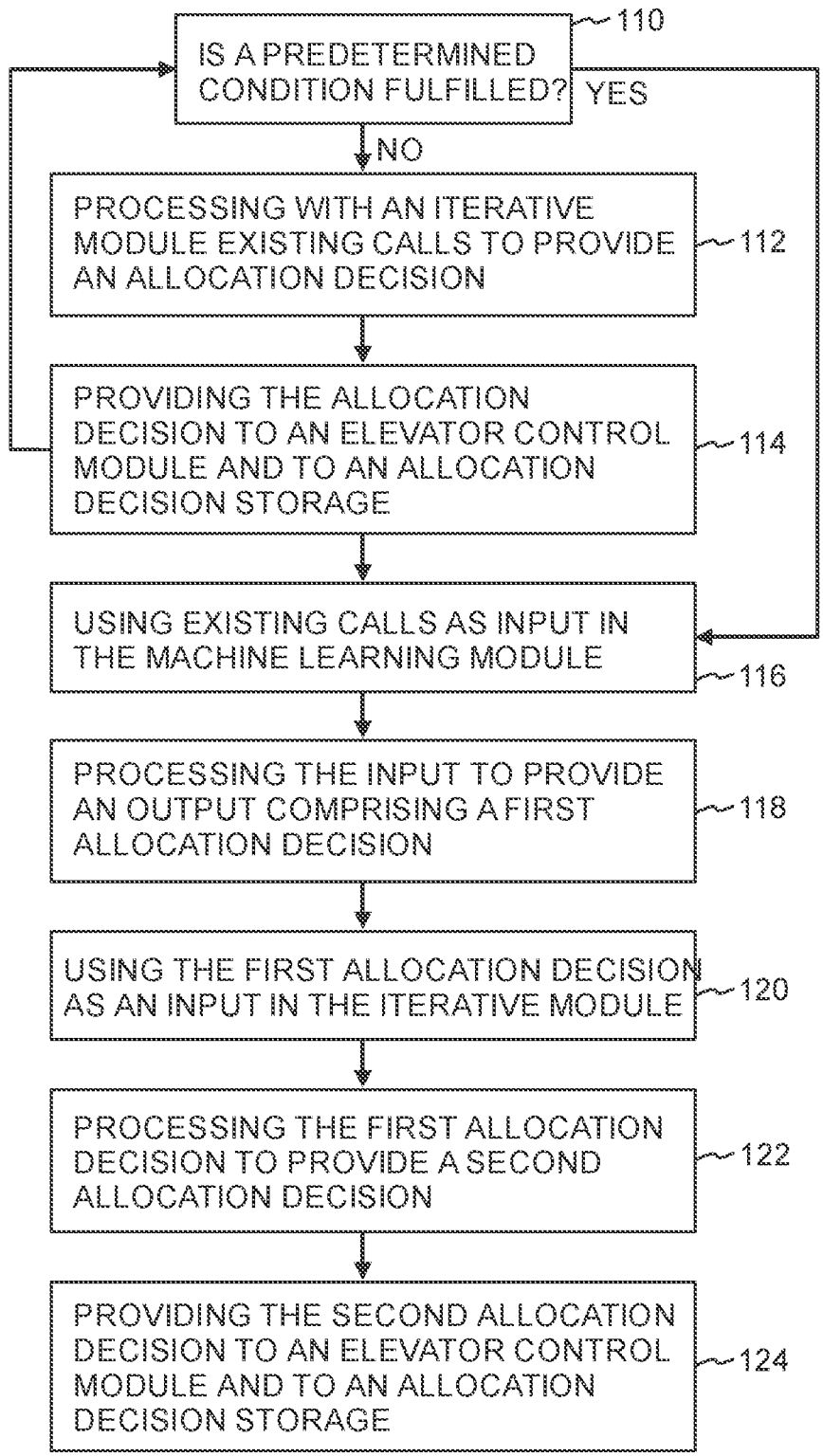
FIG. 1B is another flow diagram illustrating a method for determining an allocation decision for at least one elevator in an elevator system.

FIG. 1B is another flow diagram illustrating a method for determining an allocation decision for at least one elevator in an elevator system. As previously with FIG. 1A, FIG. 1B is discussed together with FIG. 2.

At first, at least one predetermined condition or criterion is set to determine whether the machine learning module 202 is used for providing an input to the iterative module 204 or not. The at least one predetermined condition or criterion refers, for example, to the fact whether the machine learning module 202 is still in a learning state. For example, it may be set that N first allocation decisions are made by the iterative module 204 and the machine learning module 202 is taught by the N allocation decisions. The value of N may depend, for example, on the number of elevator cars in an elevator group and/or the number of floors etc.

When the at least one predetermined condition is not met (step 110), the existing calls are processed with the iterative module 204 to provide an allocation decision (step 112). The iterative module 204 may take as an input a random allocation decision.

When the iterative module 204 finds the allocation decision, the allocation decision is provided to the elevator control module 212 and to the allocation decision storage 206. The allocation decisions in the allocation decision storage 206 can be used to train the machine learning module 202.

When it is determined that the at least one predetermined condition is fulfilled (step 110), the existing calls are used as an input in the machine learning module 202. The machine learning module 202 processes the input and provides an output comprising a first allocation decision (step 118). The first allocation decision is then provided to the iterative module 204 (step 120). The iterative module 204 uses the allocation decision from the machine learning module 202 as a starting point, and processes the first allocation decision to provide a second allocation decision (step 122). The second allocation decision is then sent to the elevator control module 212 and to the allocation decision storage 206.

The embodiment disclosed in FIG. 2B provides a solution where the machine learning module 202 is first taught and only the iterative module 206 is used to determine the allocation decisions at first. Only when it is determined that the teaching level of the machine learning module 202 is adequate, the combined operation of the machine learning module 202 and the iterative module 206 is taken into use. This enables a solution where the elevator system can be directly taken into use since the initialization phase itself does not require a separate teaching or training phase for the machine learning module 202. As disclosed above, there is a teaching phase for the machine learning module 202 but this phase is performed simultaneously when the elevator system is already in a normal use.

Figure 2:
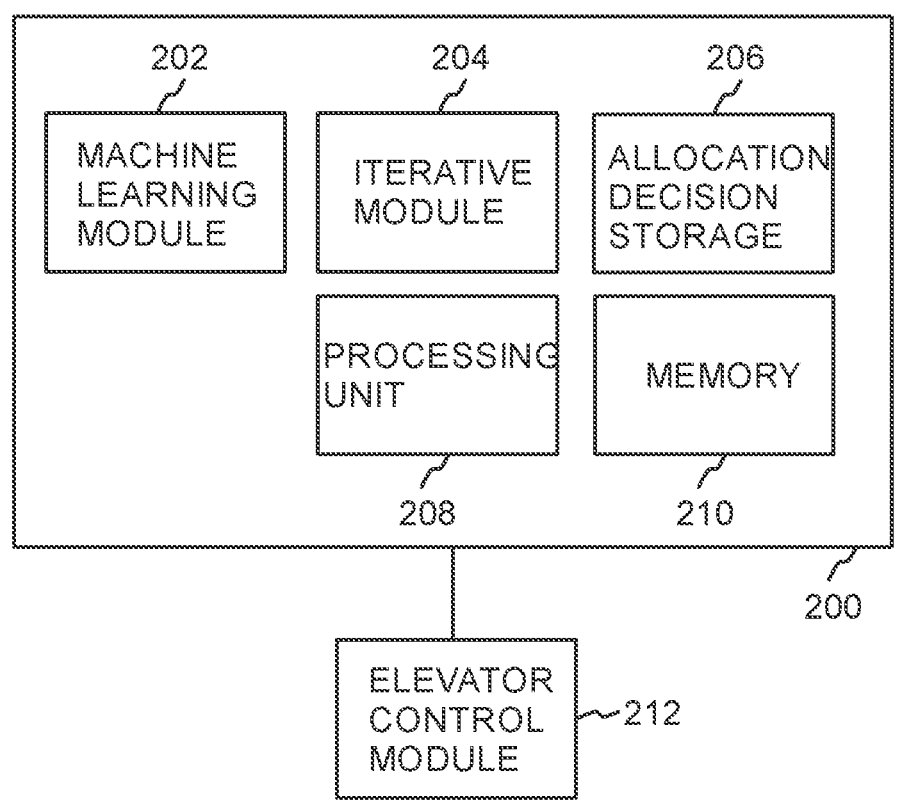
FIG. 2 is a block diagram of an apparatus for determining an allocation decision for at least one elevator in an elevator system.

In one embodiment of FIG. 2, the machine learning module comprises an artificial neural network (ANN) module and the artificial neural network may be emulated using a central processing unit or a graphics processing unit. Another possibility to implement the artificial neural network is a hardware implementation. Yet in another embodiment, the processing unit 208 and the memory 210 may be used to provide the machine learning module 202, the iterative module 204 and the allocation decision storage 206.

The processing unit 208 and the memory 210 may provide means for using existing calls in an elevator system as a first input in a machine learning module; means for processing with the machine learning module the first input to provide a first output comprising a first allocation decision; means for using the first output as a second input in an iterative module; means for processing the second input with the iterative module to provide a second output comprising a second allocation decision; and means for providing the second allocation decision to an elevator control module and to the allocation decision storage for further machine learning module training.

In one embodiment, the processing unit 208 and the memory 210 may provide means for processing with an iterative module existing calls in an elevator system to provide an allocation decision, means for providing the allocation decision from the iterative module to an elevator control module and to an allocation decision storage, means for using the allocation decision to teach the machine learning module, means for detecting that at least one predetermined criterion is fulfilled, means for using, after the at least one predetermined criterion is fulfilled, existing calls in the elevator system as a first input in the machine learning module, means for processing the first input with the machine learning module to provide a first output comprising a first allocation decision, means for using the first output as a second input in the iterative module, means for processing the second input with the iterative module to provide a second output comprising a second allocation decision, and means for providing the second allocation decision to the elevator control module and to the allocation decision storage for further machine learning module training.

The exemplary embodiments of the invention can be included within any suitable device, for example, including, servers, workstations, personal computers, laptop computers, capable of performing the processes of the exemplary embodiments. The exemplary embodiments may also store information relating to various processes described herein.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for determining an allocation decision for at least one elevator, the method comprising:
   using existing calls in an elevator system as a first input in a machine learning module;
   processing the first input with the machine learning module to provide a first output comprising a first allocation decision;
   using the first output as a second input in an iterative module;
   processing the second input with the iterative module to provide a second output comprising a second allocation decision, wherein the iterative module implements a genetic algorithm or an ant colony algorithm to process the second input comprising the first allocation decision; and
   providing the second allocation decision to an elevator control module as an allocation command and to an allocation decision storage for further machine learning module training, such that the elevator control module controls at least one elevator car based on the allocation command,
   wherein the machine learning module provides the first allocation decision based on having been trained by a certain number of previous allocation decisions provided by the iterative module.

2. The method of claim 1, further comprising:
   processing, prior to using the existing calls in the elevator system as the first input to the machine learning module, the existing calls in the elevator system with the iterative module, to provide a third allocation decision;
   providing the third allocation decision from the iterative module to the elevator control module and to the allocation decision storage, wherein the allocation decision storage is provided the third allocation decision as a previous allocation decision;
   using, until at least one predetermined criterion is fulfilled, the previous allocation decision to teach the machine learning module; and
   using, after the at least one predetermined criterion has been fulfilled, the existing calls in the elevator system as the first input in the machine learning module.

3. The method of claim 1, further comprising:
   using predicted calls in the elevator system as the first input to the machine learning module.

4. The method of claim 1, wherein the machine learning module comprises an artificial neural network module.

5. A non-transitory computer readable medium storing program code, which when executed by at least one processor, causes the at least one processor to perform the method of claim 1.

6. An apparatus for determining an allocation decision for at least one elevator, the apparatus comprising:
- a memory storing program instructions; and
- a processor configured to execute the program instructions to
  - use existing calls in an elevator system as a first input in a machine learning module;
  - process the first input with the machine learning module to provide a first output comprising a first allocation decision;
  - use the first output as a second input in an iterative module;
  - process the second input with the iterative module to provide a second output comprising a second allocation decision, wherein the iterative module implements a genetic algorithm or an ant colony algorithm to process the second input comprising the first allocation decision; and
- provide the second allocation decision to an elevator control module as an allocation command and to an allocation decision storage for further machine learning module training, such that the elevator control module controls at least one elevator car based on the allocations command,
- wherein the machine learning module provides the first allocation decision based on having been trained by a certain number of previous allocation decisions provided by the iterative module.

7. The apparatus of claim 6, wherein the processor is further configured to execute the program instructions to:
- process, prior to using the existing calls in the elevator system as the first input in the machine learning module, the existing calls in the elevator system, with the iterative module, to provide a third allocation decision;
- provide the third allocation decision from the iterative module to the elevator control module and to the allocation decision storage, wherein the allocation decision storage is provded the third allocation decision as a previous allocation decision;
- use, until at least one predetermined criterion is fulfilled, the previous allocation decision to teach the machine learning module; and
- use, after the at least one predetermined criterion has been fulfilled, existing calls in the elevator system as the first input in the machine learning module.

8. The apparatus of claim 6, wherein the processor is further configured to execute the program instructions to:
- use predicted calls in the elevator system as the first input to the machine learning module.

9. The apparatus of claim 6, wherein the machine learning module comprises an artificial neural network module.

10. The apparatus of claim 6, wherein the machine learning module comprises a graphics processing unit.

11. An elevator system comprising:
- an elevator control module configured to control at least one elevator car; and the apparatus of claim 6.

* * * * *